(12) United States Patent
Beroth

(10) Patent No.: US 6,305,644 B1
(45) Date of Patent: Oct. 23, 2001

(54) AIRCRAFT CABIN SEAT CONFIGURATION WITH ENHANCED INGRESS/EGRESS

(75) Inventor: Michael T. Beroth, Winston-Salem, NC (US)

(73) Assignee: B E Aerospace, Inc., Wellington, FL (US)

(*) Notice: Subject to any disclaimer, the term of this patent is extended or adjusted under 35 U.S.C. 154(b) by 0 days.

(21) Appl. No.: 09/483,417

(22) Filed: Jan. 14, 2000

Related U.S. Application Data

(63) Continuation-in-part of application No. 29/113,763, filed on Nov. 10, 1999.

(51) Int. Cl.[7] .................................................. B64D 11/00
(52) U.S. Cl. .............................. 244/118.5; 297/354.13; 297/245
(58) Field of Search .............................. 244/118.5, 118.6; 297/245, 354 B, 233, 67

(56) References Cited

U.S. PATENT DOCUMENTS

| | | |
|---|---|---|
| 23,581 | 4/1859 | Jackson . |
| 188,167 | 3/1877 | Mitchell . |
| D. 402,125 | 12/1998 | Dryburgh et al. . |
| D. 405,275 | 2/1999 | Dryburgh et al. . |
| 1,131,875 | 3/1915 | Thompson . |
| 3,074,759 * | 1/1963 | Bergenwall . |
| 5,308,144 | 5/1994 | Korn . |
| 5,333,818 | 8/1994 | Brandt et al. . |
| 5,352,020 | 10/1994 | Wade et al. . |
| 5,507,555 | 4/1996 | Kiguchi . |
| 5,553,923 | 9/1996 | Bilezikjian . |
| 5,628,547 | 5/1997 | Matsumiya . |
| 5,716,026 * | 2/1998 | Pascasio et al. ................... 244/118.6 |
| 5,722,726 | 3/1998 | Matsumiya . |
| 5,857,745 | 1/1999 | Matsumiya . |
| 5,954,401 * | 9/1999 | Koch et al. ........................ 297/354.13 |
| 6,113,183 * | 9/2000 | Koch et al. ........................ 297/184.14 |
| 6,209,956 * | 4/2001 | Dryburgh et al. ..................... 297/245 |

FOREIGN PATENT DOCUMENTS

| | | |
|---|---|---|
| 0 523 012 A1 | 1/1993 | (EP) . |
| 0 701 920 A1 | 3/1996 | (EP) . |
| 2 295 962 A | 6/1996 | (GB) . |

* cited by examiner

Primary Examiner—Charles T. Jordan
Assistant Examiner—Kevin Jakel
(74) Attorney, Agent, or Firm—Adams, Schwartz & Evans, P.A.

(57) ABSTRACT

A passenger seat configuration for an aircraft cabin having a fuselage wall with windows therein and an aisle for permitting movement within the cabin. The configuration includes an outboard seating unit for being positioned adjacent the fuselage wall of the aircraft, the outboard seating unit having a primary seat formed of a seat back and seat bottom, and a forwardly spaced-apart ottoman movable with respect to each other to define upright, semi-reclined and fully reclined positions. An inboard seating unit is provided for being positioned adjacent the at least one aisle and between the inboard seating unit and the aisle, the inboard seating unit having a primary seat formed of a seat back and a seat bottom, and a forwardly spaced-apart, free-standing ottoman movable with respect to each other to define upright, semi-reclined and fully reclined positions, the primary seat and ottoman of the inboard seating unit being positioned aft of the primary seat and ottoman of the outboard seating unit. The ottoman of the outboard seating unit and the ottoman of the inboard seating unit are independently movable relative to each other whereby the outboard ottoman is movable to a position relative to any position of the inboard ottoman to thereby provide space between the inboard ottoman and outboard ottoman for the outboard passenger to ingress to and egress from the outboard primary seat between the inboard ottoman and outboard ottoman and forward of the inboard ottoman to the aisle.

8 Claims, 7 Drawing Sheets

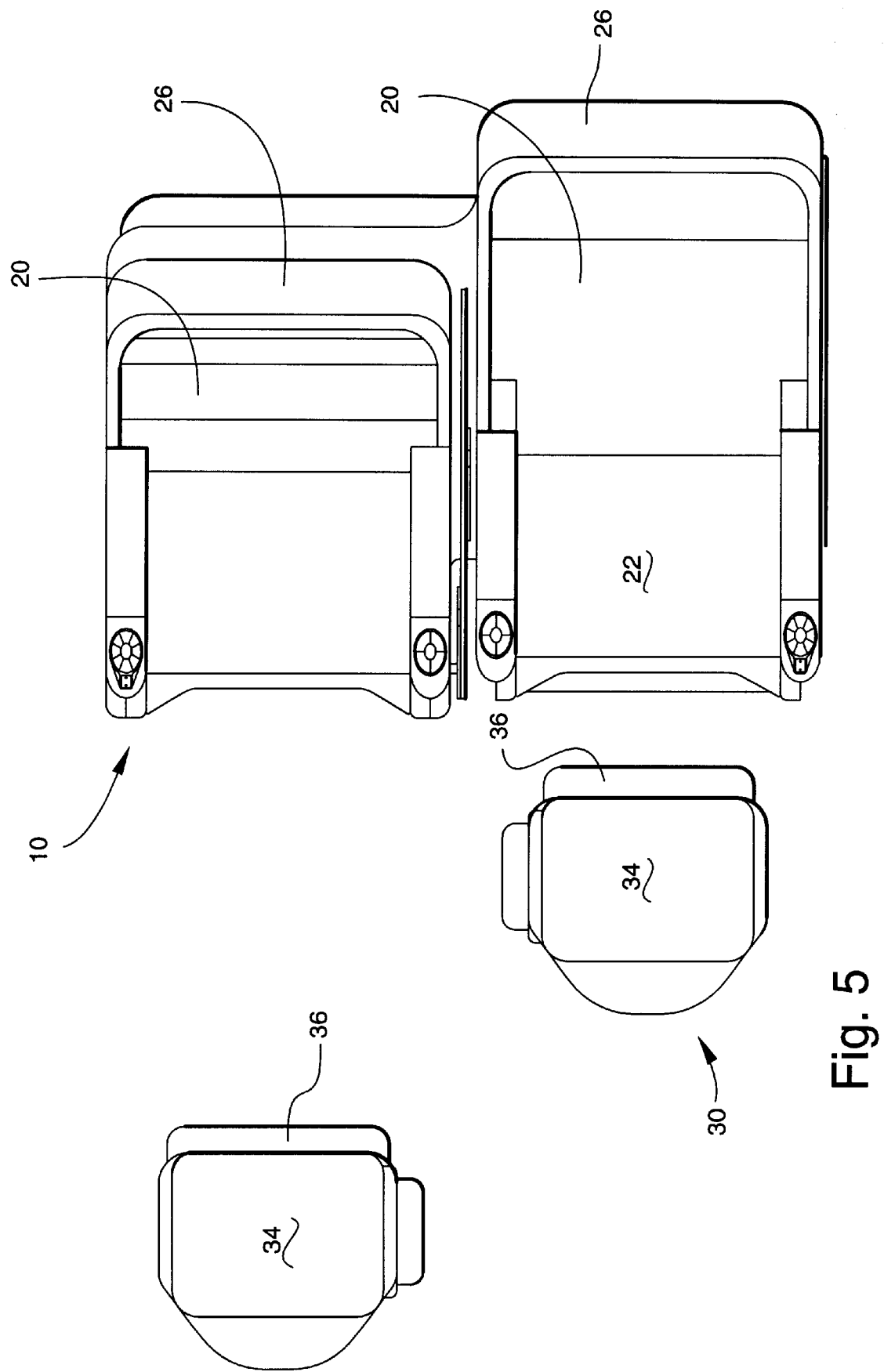

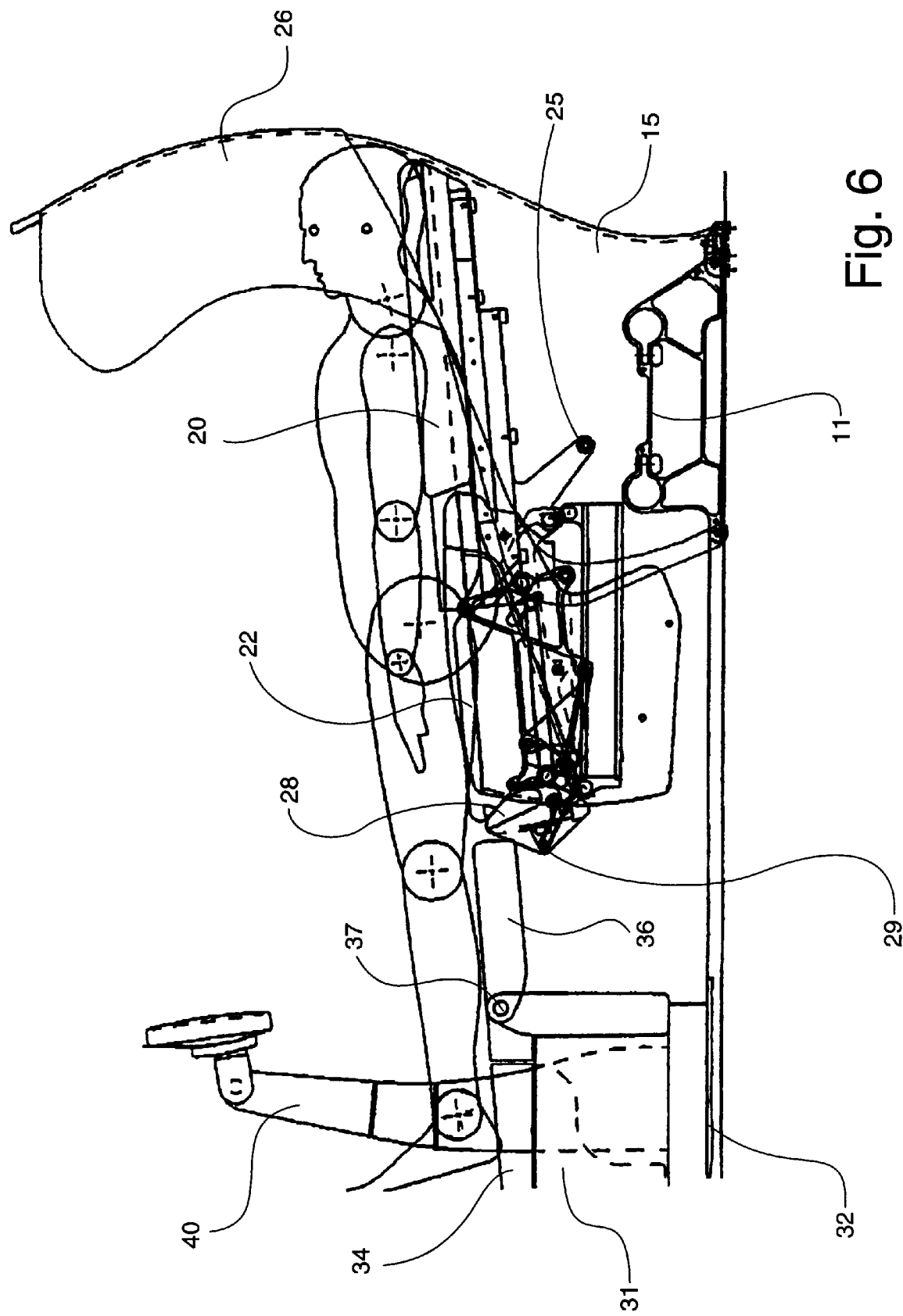

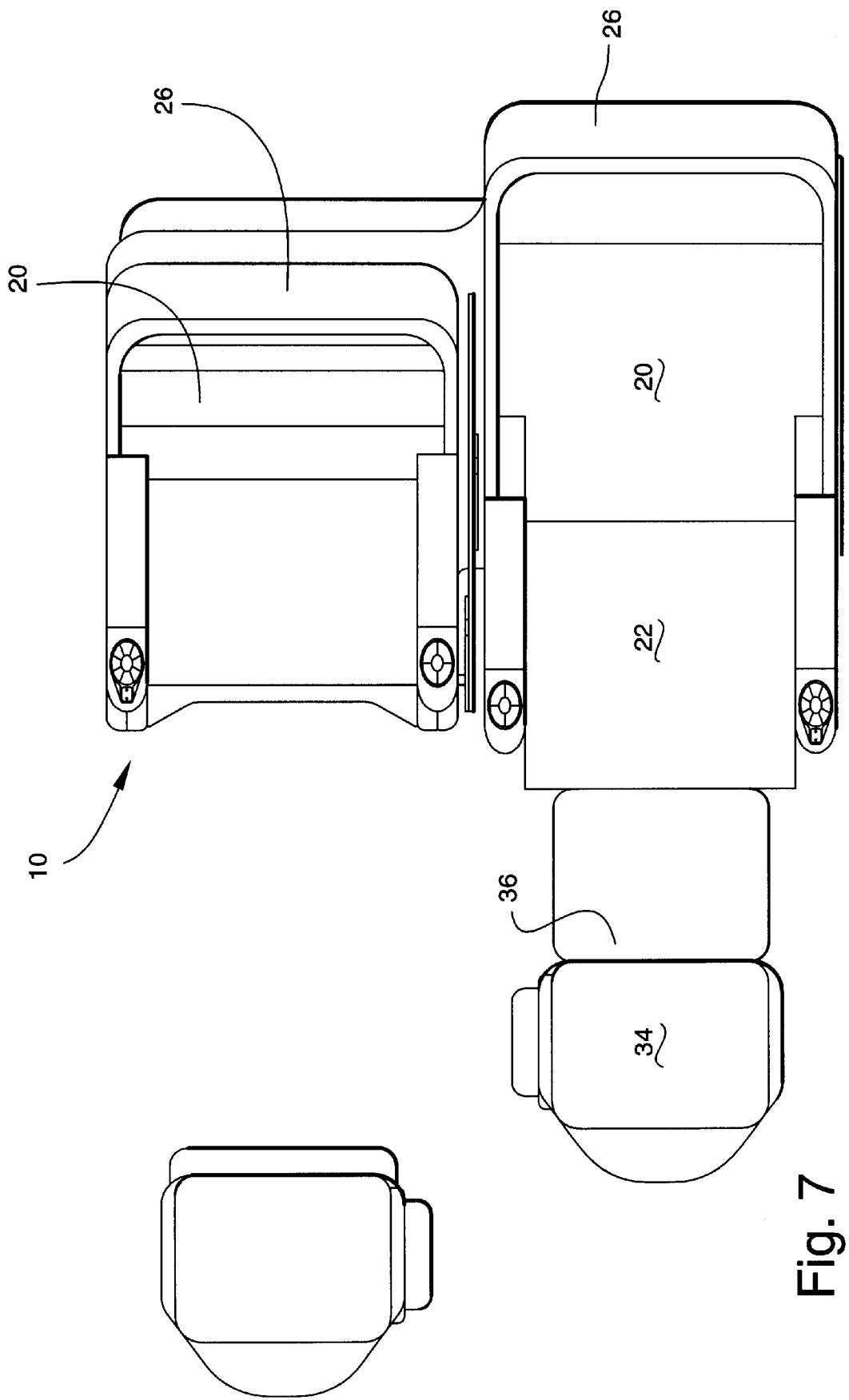

AIRCRAFT CABIN SEAT CONFIGURATION WITH ENHANCED INGRESS/EGRESS

This application is a continuation-in-part of application Ser. No. 29/113,763, filed on Nov. 10, 1999.

TECHNICAL FIELD AND BACKGROUND OF THE INVENTION

This invention relates to an aircraft cabin seat configuration with enhanced ingress and egress for the occupant of the seat adjacent the window of the aircraft. The application also discloses a sleeper seat which permits enhanced ingress and egress for the window-side passengers. The size and spacing of the seats renders the configuration most suitable for first class areas of the aircraft. The configuration is particularly suitable for the first class cabins of large, long-haul aircraft such as Boeing 747's. However, similar configurations are also useable in other long-haul aircraft such as Boeing 767's and 777's.

The cabin configuration disclosed in this application utilizes a "sleeper" seat. Such types of seats are known, and typically involve a structure which combines a seat back with a seat bottom which has telescoping segments which extend outwardly as the seat back reclines. These extending segments also generally function as leg or foot supports when the seat is in the upright or semi-reclined position. The combined length of the reclined seat back and the extended seat bottom segments are intended to provide sleeping surface.

One particular problem encountered in prior art sleeper seats is that the length and configuration of the inboard aisle seat, when in the reclined sleeping position traps the occupant of the outboard window seat in the seat by blocking access to the aisle. This is a significant problem, particularly on long-haul flights during which passengers may wish to sleep for several hours without being disturbed.

Of course, this problem could be solved merely by placing the seats so far apart that access to each seat is possible no matter what seating configuration is used. However, this is an impractical solution given the necessity of fitting a given amount of passenger load within a given space. In addition, too great a distance between adjacent seats prevents conversation and social interaction between passengers traveling together.

The invention according to this application provides a unique seating arrangement in which adjacent seats are relatively close together, and in which the inboard aisle seat occupant can sit in an upright, semi-reclined or fully reclined sleep position without blocking the outboard window seat occupant from the aisle. This is done while maintaining an adequate number of seats in a predefined space, such as the first class cabin of a long haul passenger jet such as a Boeing 747.

SUMMARY OF THE INVENTION

Therefore, it is an object of the invention to provide a seat configuration for an aircraft cabin.

It is another object of the invention to provide a seat configuration for an aircraft cabin which provides enhanced ingress and egress for a seat occupant seated adjacent an aircraft window side of the aircraft outboard of a seat adjacent an aisle in the aircraft cabin.

It is another object of the invention to provide a seat configuration for an aircraft cabin wherein the occupant of a window seat can ingress to and egress from the seat without disturbing the occupant in the adjacent aisle seat.

It is another object of the invention to provide a seat configuration for an aircraft cabin wherein the occupant of a window seat can ingress to and egress from the seat without disturbing the occupant in the adjacent aisle seat while the aisle seat is in any seating position.

It is another object of the invention to provide a seat configuration wherein the seat is reclinable to a sleeping position.

It is another object of the invention to provide a seat configuration which includes an ottoman positioned in front of a primary seat as a combination foot and leg rest.

It is another object of the invention to provide a seat configuration which utilizes an ottoman which functions as a footrest when the primary seating unit is in an upright position.

It is another object of the invention to provide a seat configuration which utilizes an ottoman as a combination foot and leg rest when the primary seat is in semi-reclined and fully reclined positioned.

It is another object of the invention to provide a seat configuration which utilizes an ottoman as a storage area for the occupant in the primary seat.

These and other objects of the present invention are achieved in the preferred embodiments disclosed below by providing a passenger seat configuration for an aircraft cabin having a fuselage wall with windows therein and an aisle for permitting movement within the cabin. The configuration includes an outboard seating unit for being positioned adjacent the fuselage wall of the aircraft, the outboard seating unit having a primary seat formed of a seat back and seat bottom, and a forwardly spaced-apart ottoman movable with respect to each other to define upright, semi-reclined and fully reclined positions. An inboard seating unit is provided for being positioned adjacent the at least one aisle and between the inboard seating unit and the aisle, the inboard seating unit having a primary seat formed of a seat back and a seat bottom, and a forwardly spaced-apart, free-standing ottoman movable with respect to each other to define upright, semi-reclined and fully reclined positions, the primary seat and ottoman of the inboard seating unit being positioned aft of the primary seat and ottoman of the outboard seating unit. The ottoman of the outboard seating unit and the ottoman of the inboard seating unit are independently movable relative to each other whereby the outboard ottoman is movable to a position relative to any position of the inboard ottoman to thereby provide space between the inboard ottoman and outboard ottoman for the outboard passenger to ingress to and egress from the outboard primary seat between the inboard ottoman and outboard ottoman and forward of the inboard ottoman to the aisle. The ottoman of the outboard seating unit is mounted for a greater degree of movement forwardly away from the outboard primary seat than is the ottoman of the inboard seating unit relative to the inboard primary seat.

According to one preferred embodiment of the invention, the outboard seating unit and the inboard seating unit each have a pitch of 92 inches.

According to another preferred embodiment of the invention, the outboard ottoman is mounted for 20 inches of fore and aft movement, and the inboard ottoman is mounted for 14 inches of fore and aft movement.

According to another preferred embodiment of the invention, each of the primary seats includes a privacy shell positioned around the back and sides of the seat back.

According to yet another preferred embodiment of the invention, the privacy shell is stationarily-mounted for movement of the scat back relative thereto among upright, semi-reclined and fully reclined positions.

According to yet another preferred embodiment of the invention, the seat bottom of the outboard and inboard primary seats each move in a forward direction as the seat back reclines and the ottomen of the respective outboard and inboard seating units move aft into engagement with its respective seat bottom to form a fully reclined sleeping surface.

According to yet another preferred embodiment of the invention, each ottoman includes a stanchion supporting a table.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 5 is a top plan view of a pair of first class sleeper seats in the semi-reclined, or lounge, position;

FIG. 6 is a vertical cross-section of the seat shown in FIG. 1 in the fully reclined, or sleeping, position; and FIG. 7 is a top plan view of a pair of first class sleeper seats in the fully reclined, or sleep, position.

DESCRIPTION OF THE PREFERRED EMBODIMENT AND BEST MODE

Figure 1:
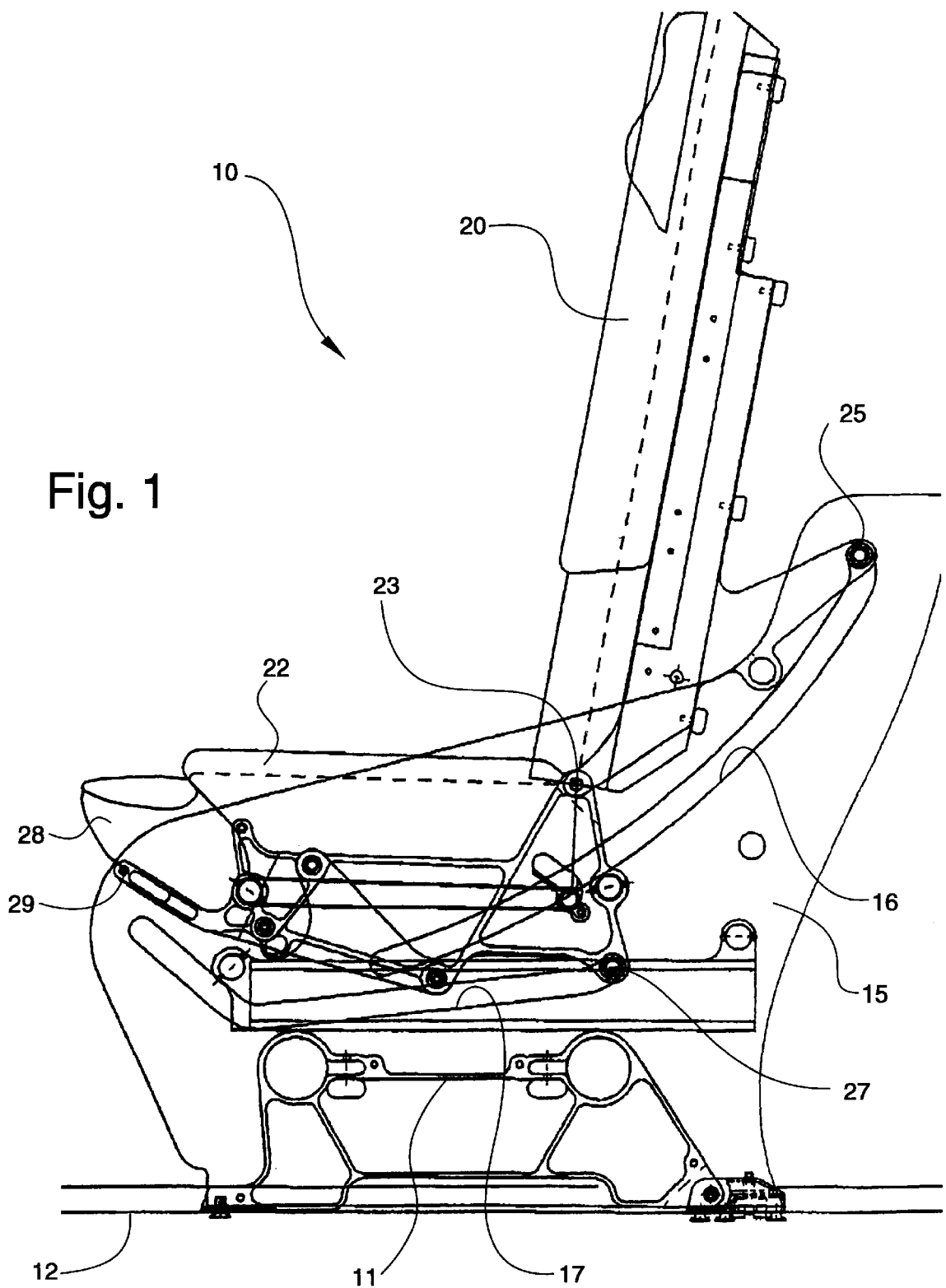
FIG. 1 is a vertical cross-section, with the privacy shell removed for clarity, of a first class sleeper seat according to an embodiment of the invention.

Referring now specifically to the drawings, a first class sleeper seat according to the present invention is illustrated in FIG. 1 and shown generally at reference numeral 10. Seat 10 includes a seat frame 11 which is attached to a track 12 mounted on the deck of an airplane. Attachment is made by use of track fittings, such as those disclosed in applicant's U.S. Pat. No. 5,871,318. The seat frame 11 includes a pair of horizontally spaced-apart side supports 15 in which are formed a pair of elongate guide slots 16, 17. Slots 16, 17 guide movement of a seat back 20 and seat bottom 22, respectively. Seat back 20 and seat bottom 22 are joined for pivotal movement relative to each other by pivot pin 23.

Scat back 20 is mounted between side supports 15 by guide pins 25 mounted for sliding movement in guide slots 16. Likewise, seat bottom 22 is mounted between side supports 15 by guide pins 27. Seat movement occurs by operation of electric motors (not shown) in a conventional manner. The shape of the guide slots 16 and 17 determine the configuration of the seating surface provided for the seat occupant.

Seat 10 also includes an articulating bolster 28 which normally resides forward of the seat bottom 22 and can provide additional support to the back of the leg to taller than normal occupants in the deployed position, as shown, or can be stowed for shorter occupants and when the seat 10 is in the fully reclined sleep position. The bolster 28 moves between these two positions by articulating about a pivot 29 under control of a motor (not shown) during movement among seating positions or, alternatively, by being engaged and pivoted into the stowed position by the front of the seat bottom. In either case, the bolster 28 can be moved independently by the occupant.

Figure 2:
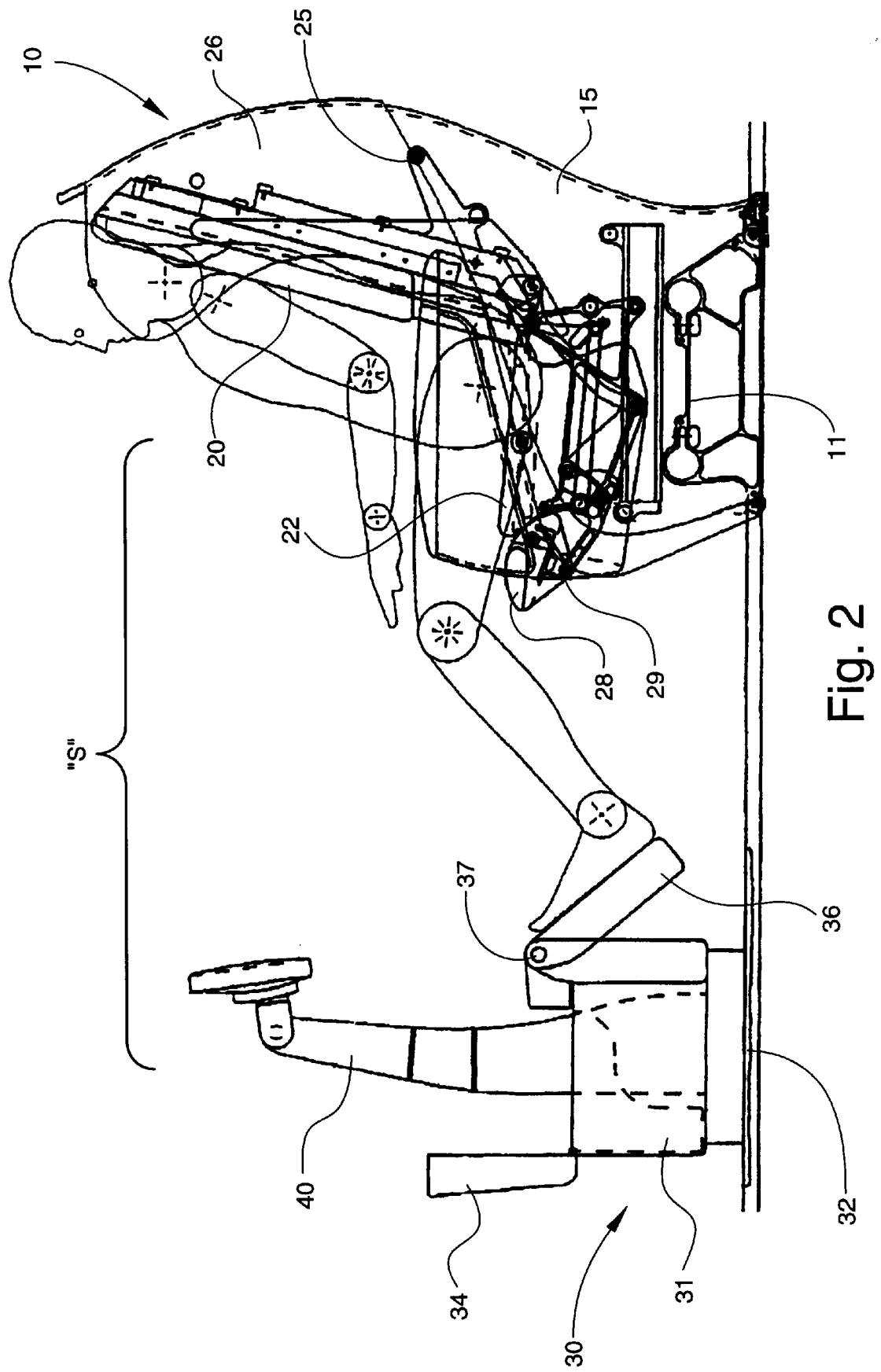
FIG. 2 is a vertical cross-section of the seat shown in FIG. 1 in the fully upright position.

Referring now to FIG. 2, seat 10 includes a privacy shell 26, which encloses the back and sides of the seat back 20. As is shown in FIG. 2, the shell 26 is configured to permit the occupant to see over and around the shell 26 when sitting upright, but to be shielded from view from the sides when in the semi-reclining (FIG. 4) and fully reclined (FIG. 6) positions.

In FIG. 2 and following, seat 10 is shown in combination with an ottoman 30, which function together as a seating unit "S". Seat 10 functions as a primary seat, whereas the ottoman 30 functions secondarily as a foot and leg support, in addition to providing storage for the occupant's personal effects. The ottoman 30 comprises a frame 31 which is mounted on tracks 32 for fore and aft movement, as described below. The ottoman 30 may be used in combination with a pair of stanchions 40 positioned on either side of the ottoman 30, and on which may be carried a video monitor, dining table and the like.

Ottoman 30 also includes a top cushion 34 carried on atop surface of the ottoman 34, and a leg rest cushion 36 mounted on the side of the ottoman 30 facing the seat 10. The leg rest cushion 36 is preferably pivotally-mounted by means of a pivot 37 for movement among different positions, as described below. Preferably, the leg rest cushion 36 is moved by means of a motor (not shown) in a conventional manner. Preferably, movement of the leg rest cushion 36 is coordinated with movement of the seat back 20 and seat back 22, whereby the occupant selects a seating position, and motors move the moveable seating components to the desired position. In accordance with conventional practice, the seating position is selected and operated by controls mounted on seat 10 in a position convenient to the occupant. Preferably, the occupant can also individually control each seating component to a limited extent as desired to adjust the seat to the exact requirements of a particular occupant. Similarly, the occupant can individually move the leg rest cushion 36 of the ottoman 30 to its stowed position flush against the rear-facing side of the ottoman 30, if desired.

FIG. 2 illustrates the seating unit in an fully upright position for landing and takeoff, dining, working and video viewing. The seat 10 and the ottoman 40 are shown in a position whereby the seat occupant is seated upright and the leg rest cushion 36 is deployed to an angle at approximately a 45 degree angle to the vertical. In this position, the support surface of the leg rest cushion 36 is angled to receive and support the feet of the seat occupant, as shown. In the particular embodiment disclosed herein, the ottoman 30 is moved on tracks 32 to a position approximately 32 inches from the front of the seat 10.

Figure 3:
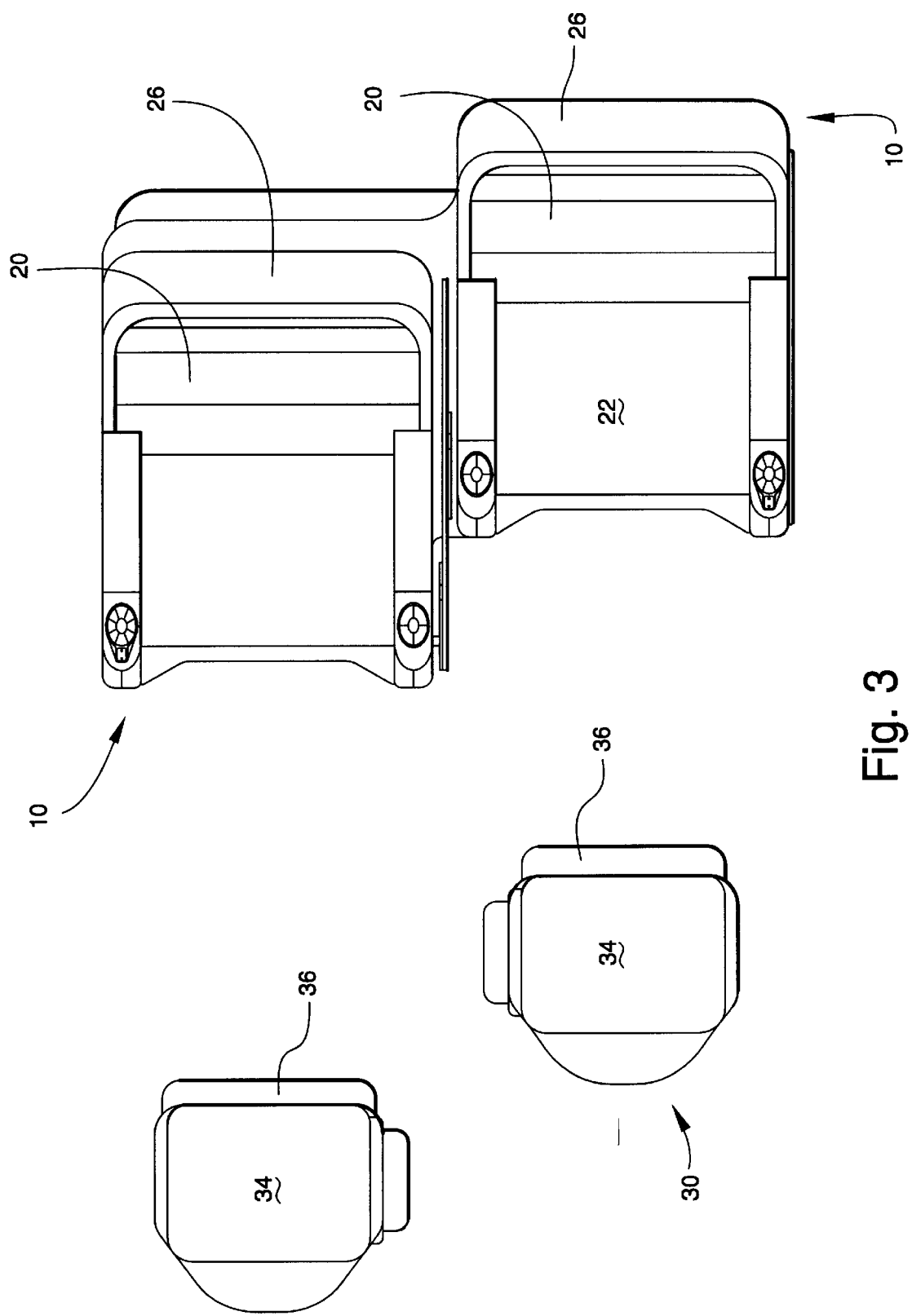
FIG. 3 is a top plan view of a pair of first class sleeper seats in the fully upright position.

This position is also shown in FIG. 3, where is also illustrated the staggered configuration of adjacent seating units "S". This position provides greater privacy for adjacent seat occupants and also permits the "window" seat occupant to leave and return to the seat between the two ottomen 34 without disturbing the "aisle" seat occupant.

Figure 4:
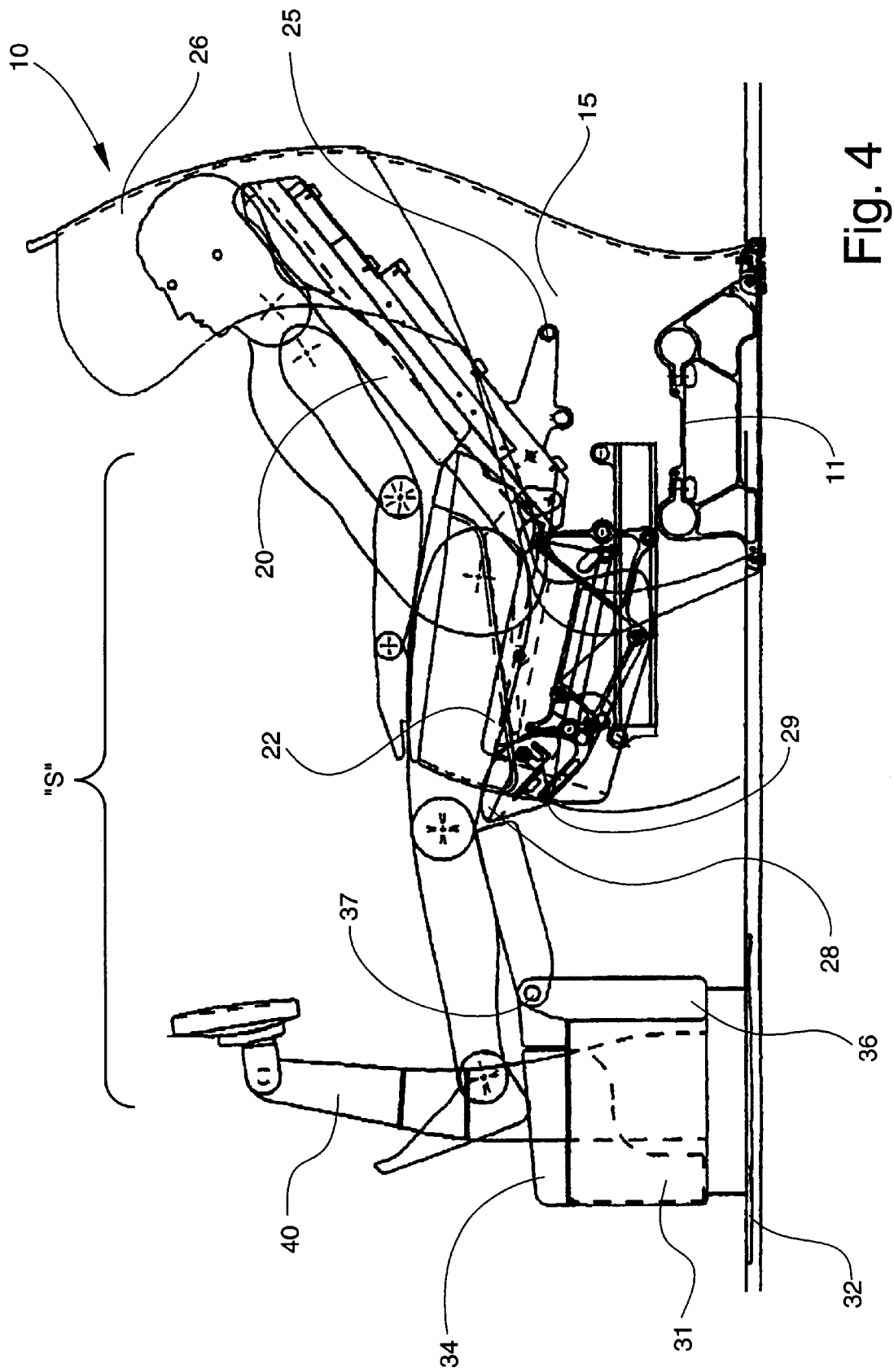
FIG. 4 is a vertical cross-section of the seat shown in FIG. 1 in the semi-reclined, or lounge, position.

Referring now to FIG. 4, seating unit "S" is shown in the semi-reclined lounge position. In this position the occupant is supported along the entire body length. Scat back 20, seat bottom 22 and bolster 28 support the back, thighs and upper leg, as shown. The ottoman 30 has been moved towards the seat 10 by approximately 2.5 inches, and the leg rest cushion 36 as been deployed upwards to a position above the horizontal. The rearward edge of the leg rest cushion 36 either engages or is closely spaced-apart from the outer edge of the bolster 28 and, as shown, supports the lower leg of the occupant, while the feet rest by the heels on the top cushion 34. This position provides a comfortable semi-reclining position with the head elevated above the rest of the body and with the legs comfortably flexed at the knees. See, also, FIG. 4.

Referring now to FIG. 6, seating unit "S" is shown in the fully reclined sleep position of approximately 3 degrees above the horizontal. The occupant is permitted to fully recline, with the head only very slightly above the remainder of the body. In this position, the bolster 28 is pivoted downwardly out of contact with the occupant, and the leg rest cushion 36 of the ottoman 30 aligned with plane of the seat back 20, seat bottom 22 and top cushion 34 of the ottoman 30 to collectively form the sleeping surface. Note that the position of the leg rest cushion 36 of the ottoman 30 is slightly lower than in the semi-reclined lounge position shown in FIG. 4, and that the ottoman has removed away from the seat 10 to a distance of approximately 33 inches.

As is shown in FIGS. 5 and 7, the occupant in the aisle seat 10 can lounge in a semi-reclined position (FIG. 5) or sleep in a full reclined position (FIG. 7) while the occupant of the seat 10 adjacent the window can egress/ingress between the two ottomen 30 without disturbing the aisle seat occupant. Similarly, the occupant of the window seat 10 can ingress/egress between the two ottomen 36 while the aisle seat 10 occupant is dining or using the table for work.

A passenger sleeper seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A passenger seat configuration for an aircraft cabin having a fuselage wall with windows therein and an aisle for permitting movement within the cabin, and comprising:

(a) an outboard seating unit for being positioned adjacent the fuselage wall of the aircraft, the outboard seating unit having a primary seat formed of a seat back and seat bottom, and a forwardly spaced-apart ottoman movable with respect to each other to define upright, semi-reclined and fully reclined positions;

(b) an inboard seating unit for being positioned adjacent the at least one aisle and between the inboard seating unit and the aisle, the inboard seating unit having a primary seat formed of a seat back and a seat bottom, and a forwardly spaced-apart, free-standing ottoman movable with respect to each other to define upright, semi-reclined and fully reclined positions, the primary seat and ottoman of the inboard seating unit being positioned aft of the primary seat and ottoman of the outboard seating unit; and (c) the ottoman of the outboard seating unit and the ottoman of the inboard seating unit being independently movable relative to each other whereby the outboard ottoman is movable to a position relative to any position of the inboard ottoman to thereby provide space between the inboard ottoman and outboard ottoman for the outboard passenger to ingress to and egress from the outboard primary seat between the inboard ottoman and outboard ottoman and forward of the inboard ottoman to the aisle.

2. A passenger seat configuration according to claim 1, wherein the ottoman of the outboard seating unit is mounted for a greater degree of movement forwardly away from the outboard primary seat than is the ottoman of the inboard seating unit relative to the inboard primary seat.

3. A passenger seat configuration according to claim 2, wherein said outboard seating unit and said inboard seating unit each have a pitch of 92 inches.

4. A passenger seat configuration according to claim 3, wherein said outboard ottoman is mounted for 20 inches of fore and aft movement, and said the inboard ottoman is mounted for 14 inches of fore and aft movement.

5. A passenger seat configuration according to claim 1, wherein each of said primary seats includes a privacy shell positioned around the back and sides of the seat back.

6. A passenger seat configuration according to claim 5, wherein said privacy shell is stationarily-mounted for movement of the seat back relative thereto among upright, semi-reclined and fully reclined positions.

7. A passenger seat configuration according to claim 6, wherein the seat bottom of the outboard and inboard primary seats each move in a forward direction as the seat back reclines and the ottomen of the respective outboard and inboard seating units move aft into engagement with its respective seat bottom to form a fully reclined sleeping surface.

8. A passenger seat configuration according to claim 6, wherein each ottoman includes a stanchion supporting a table.

\* \* \* \* \*